(12) United States Patent
Jublot (10) Patent No.: US 7,386,087 B2
(45) Date of Patent: Jun. 10, 2008

(54) METHOD AND DEVICE FOR LOADING A FUEL ASSEMBLY INTO THE CORE OF A NUCLEAR REACTOR

(75) Inventor: Patrice Jublot, Asnieres (FR)

(73) Assignee: Framatome ANP, Courbevoie (FR)

( * ) Notice: Subject to any disclaimer, the term of this patent is extended or adjusted under 35 U.S.C. 154(b) by 5 days.

(21) Appl. No.: 10/538,419

(22) PCT Filed: Dec. 3, 2003

(86) PCT No.: PCT/FR03/03579

§ 371 (c)(1),
(2), (4) Date: Sep. 20, 2005

(87) PCT Pub. No.: WO2004/064076

PCT Pub. Date: Jul. 29, 2004

(65) Prior Publication Data

US 2006/0034413 A1   Feb. 16, 2006

(30) Foreign Application Priority Data

Dec. 10, 2002   (FR) .................................. 02 15607

(51) Int. Cl.
*G21C 19/00* (2006.01)
(52) U.S. Cl. ...................... 376/261; 376/262; 376/260; 376/264; 376/268
(58) Field of Classification Search ............... 376/262, 376/261, 260, 264, 268
See application file for complete search history.

(56) References Cited

U.S. PATENT DOCUMENTS

| | | | | | |
|---|---|---|---|---|---|
| 3,235,563 | A | * | 2/1966 | Sankovich | 376/349 |
| 3,297,541 | A | * | 1/1967 | Dickson | 376/361 |
| 3,603,634 | A | | 9/1971 | Kumpf | |
| 3,802,996 | A | * | 4/1974 | Jones | 376/440 |
| 4,448,744 | A | * | 5/1984 | Karger et al. | 376/262 |
| 4,788,028 | A | * | 11/1988 | Leclerco et al. | 376/264 |
| 5,420,899 | A | * | 5/1995 | Apple et al. | 376/261 |
| 5,619,547 | A | * | 4/1997 | Amiet et al. | 376/261 |

FOREIGN PATENT DOCUMENTS

DE          34 01 272 A       7/1985

* cited by examiner

*Primary Examiner*—Rick Palabrica
(74) *Attorney, Agent, or Firm*—Connolly Bove Lodge & Hutz LLP (57) ABSTRACT

The invention relates to a method and a device for loading a fuel assembly into the core of a nuclear reactor. The inventive method consists in: inserting a dummy assembly (4) into the loading location (3) of the fuel assembly (5), said dummy assembly essentially having the same shape and dimensions as the loading location (3) and comprising smooth side walls; fixing the position of at least one fuel assembly (5) that is adjacent to the loading location (3), in the presence of the aforementioned dummy assembly (4), in relation to at least one second assembly (5) of the core, using at least one fuel assembly support tool (11); removing the dummy assembly (4) from the loading location (3); introducing the fuel assembly (5) which is being loaded into the loading location (3); and removing the fuel assembly support tool(s) (11).

14 Claims, 7 Drawing Sheets

METHOD AND DEVICE FOR LOADING A FUEL ASSEMBLY INTO THE CORE OF A NUCLEAR REACTOR

The invention relates to a method and device for loading a fuel assembly into the core of a nuclear reactor and in particular into the core of a pressurised water-cooled nuclear reactor.

Pressurised water-cooled nuclear reactors comprise a nuclear reactor core within a reactor vessel, the core of the nuclear reactor comprising fuel assemblies, generally of straight prismatic shape, which are placed with their longitudinal axes in the vertical direction and along which the pressurised cooling water of the nuclear reactor circulates in an upward direction.

The fuel assemblies in the reactor core are positioned within the lower internal equipment of the nuclear reactor vessel comprising in particular a core supporting plate, or lower core plate, and a surrounding wall comprising vertical plates holding the peripheral assemblies of the core.

The fuel assemblies in the core rest on the core supporting plate through their lower members, or bottom nozzles, which incorporate openings which engage vertical axis positioning pins fixed to the core supporting plate. The juxtaposed fuel assemblies comprise a dense group in which each of the fuel assemblies is in contact with adjacent assemblies within a location of right prismatic shape whose position is perfectly defined within the core, the location for one fuel assembly being bounded by vertical planes constituting the geometrical envelope of the fuel assembly of right prismatic shape. The virtual vertical plane surfaces of each of the fuel assemblies in the core are also contact surfaces between the fuel assembly and the adjacent assemblies in the core, or again with the inner surfaces of one or more vertical surrounding walls.

The right transverse cross-sections of the fuel assembly locations within the core, in transverse planes perpendicular to the vertical axis of the core, form a regular system throughout the cross-section of the core.

The fuel assemblies generally have a right cross-section of square shape and their locations comprise a square grid arrangement throughout the cross-section of the core within the surrounding wall.

The fuel assemblies, which are generally of square cross-section, incorporate struts/grids which hold a bundle of fuel rods parallel to the axial direction, and at the extremities of the assembly an upper nozzle and a lower nozzle through which the assembly rests on the core supporting plate. Within the core the fuel assemblies are in contact with adjacent fuel assemblies through their struts/grids and nozzles.

The fissile fuel material present within the fuel assembly rods is progressively consumed within the nuclear reactor when it is in service, so the fuel assemblies become progressively impoverished in fissile fuel material and undergo some wear. Operations for reloading the core of the nuclear reactor have to be performed at intervals. These operations, which require shutdown and cooling of the nuclear reactor, comprise replacing some of the fuel assemblies positioned within a zone of the core with new assemblies, the other assemblies in the core which are not replaced by new assemblies being moved from one zone of the core to another. When the nuclear reactor is first placed in service the core must be loaded with new fuel assemblies comprising the first charge for the nuclear reactor.

The operations of loading and unloading a nuclear reactor are performed under water, the head of the vessel being taken apart from the top level of the reactor pool, into the bottom of which the reactor pit opens.

A machine for lifting and handling the fuel assemblies, known as a loading machine, which incorporates means for movement and guidance in horizontal directions, located above the upper level of the pool, in such a way that gripping and lifting means of the loading machine can be positioned immediately above each of the fuel assembly locations in the core of the reactor, is used to carry out the operations of loading and unloading.

In order to load a fuel assembly into a location within the core, the assembly which is to be loaded and is fixed in a vertical position through the gripping means of the loading machine is positioned and then the fuel assembly is inserted into its loading position by movements of the loading machine and its gripping and lifting means.

When the reactor is in operation, the fuel assemblies, which are subjected to irradiation and which are the source of an intense release of heat, may undergo deformation. Because the fuel assemblies are of a very slender shape, their transverse cross-section having very much smaller dimensions than their axial length, they may undergo deformation, for example by buckling, resulting in a relatively large displacement of the nozzles at their extremities in relation to the theoretical positions of those nozzles centred on the axis of the fuel assembly.

Because of this, the upper parts of fuel assemblies adjacent to a location in which a fuel assembly has to be loaded may be displaced into the theoretical location into which the fuel assembly will be loaded, as a result of their deformation through buckling. As a consequence it may in some case be very difficult to insert the fuel assembly into its location in order to load it. In particular the locations of the peripheral assemblies are bounded in one or two vertical surfaces by the surrounding wall and on the other sides by the adjacent fuel assemblies of peripheral assemblies. Deformation of the upper parts of the fuel assemblies adjacent to the peripheral assemblies in the direction of the surrounding wall may restrict the space for inserting the peripheral fuel assembly in the core, so that loading becomes very difficult or impossible.

In general, deformation of the fuel assemblies used for reloading the core of a nuclear reactor may complicate and considerably lengthen loading operations, which causes the loss of a great deal of time in the critical path for the shutdown of that unit of the nuclear power station.

In order to assist the insertion of a fuel assembly into its location within a core it has been proposed that dummy assemblies or dummy fuel assembly nozzles should be used, placed on the supporting plate of the core around a location in which the fuel assembly which is to be reloaded is inserted. These devices bring about a substantial improvement in the positioning of deformed fuel assemblies within the core, but their use is complex because of the fact that these devices must be fitted in the bottom of the reactor pool and recovered therefrom before and after the fuel assembly is positioned. In addition to this, with these devices it is not possible for continuous loading to take place through the successive positioning of fuel assemblies in the core of the nuclear reactor, or again for fuel assemblies within the core in locations bounded by other fuel assemblies which might be deformed to be replaced.

A device for loading a fuel assembly through which the lower nozzle openings of the fuel assembly are engaged on the positioning pins of the core supporting plate in the location intended for the fuel assembly have also been proposed, in FR 99 00457. Such devices also fail to assist the insertion of a fuel assembly into a location bounded by adjacent fuel assemblies which have been deformed.

The object of the invention is therefore to provide a method for the loading of fuel assemblies into a loading location in the core of a nuclear reactor comprising fuel assemblies of generally straight prismatic shape located within a surrounding wall, in adjacent right prismatic locations having vertical axes, the transverse cross-sections of which in a horizontal plane form a regular grid, the location for loading the fuel assembly comprising at least one lateral vertical surface along which a lateral surface of a fuel assembly adjacent to the fuel assembly being loaded is positioned, this process rendering loading of the fuel assembly easier and reducing the time required for loading in those circumstances where at least one of the fuel assemblies adjacent to the fuel assembly being loaded is deformed in such a way as to be displaced into the loading location.

With this object:
- a dummy assembly having substantially the shape and dimensions of the location and having smooth side walls, substantially over the full height of the loading location, is inserted into the loading location,
- the position of the at least one adjacent assembly is fixed, with the dummy assembly present, in relation to at least one second assembly in the core, at least in the upper part of the adjacent assembly,
- the dummy assembly is removed from the loading location and,
- the fuel assembly which is to be loaded into the loading location is inserted.

The invention also relates to a loading device for a fuel assembly in a loading location in the core of a nuclear reactor comprising fuel assemblies of general straight prismatic shape located within a surrounding wall in adjacent right prismatic locations having vertical axes, whose transverse cross-sections in a horizontal plane form a regular pattern, the loading location for the fuel assembly comprising at least one vertical lateral surface along which a lateral surface of a fuel assembly adjacent to the fuel assembly being loaded is positioned, characterised in that it comprises a tool for aligning the fuel assemblies in the form of a dummy assembly having the general right prismatic shape of a fuel assembly location within the core and bounded laterally by smooth walls, and
- at least one tool for holding fuel assemblies comprising a supporting plate and positioning pins designed to engage the positioning openings of the upper nozzles of the fuel assemblies of the core,
- and at least one handling means for gripping and handling the fuel assembly alignment tool and at least one tool holding the fuel assemblies through suspension and holding means.

Preferably:
- the means suspending and holding the alignment tool for the fuel assemblies and the tool holding the fuel assemblies is similar to a part suspending and holding an upper nozzle of a fuel assembly in the core, and the fuel assembly alignment tool handling device and the fuel assembly holding tool is a gripper of a machine for loading the nuclear reactor,
- the fuel assembly alignment tool comprises a central body, an upper end member and a lower end member having a common longitudinal axis and a transverse cross-section in a plane perpendicular to the axis which has the shape of the transverse cross-section of a location for a fuel assembly in the core of the nuclear reactor,
- the central body and the lower end member of the fuel assembly alignment tool of right prismatic shape have a transverse cross-section of dimensions smaller than the dimensions of the transverse cross-section of a fuel assembly location in the core, an upper end member whose transverse cross-section has the dimensions of the transverse cross-section of a location for a fuel assembly in the reactor core, and an intermediate part between the central body and the upper end member bounded by side walls which are inclined with respect to the axis of the fuel assembly alignment tool which has a transverse cross-section of a size which generally increases between the central body and the upper end member,
- the fuel assembly alignment tool comprises a central body of right prismatic shape whose transverse cross-section has the dimensions of the transverse cross-section of a location for a fuel assembly in the core of the reactor, and a lower end member having side walls which are inclined with respect to the axis of the fuel assembly alignment tool in such a way that the transverse cross-section of the lower end member has dimensions which decrease between the central body and its lower extremity which engages in a location in the core of the nuclear reactor,
- the lower end member of the alignment tool comprises lateral openings for the passage of positioning pins at a location in the reactor core and two posts which engage in the water holes of the location when the alignment tool is positioned on the supporting plate for the reactor core,
- the lower end member of the alignment tool has a cross-section such that it can be engaged between the positioning pins of a location for a fuel assembly in the reactor core and two posts engaging the water holes of the location when the alignment tool is positioned on the supporting plate for the reactor core,
- the walls which are inclined with respect to the axis of the intermediary part or lower end member of the fuel assembly alignment tool have successive portions in the direction of the axis which are inclined with respect to the axis and substantially parallel thereto,
- the fuel assembly holding tool comprises a supporting plate, a first set of positioning fingers and a second set of positioning fingers which are parallel to each other and secured in positions perpendicular to the supporting plate, the positioning fingers of the second set having a length in the direction perpendicular to the supporting plate which is shorter than the lengths of the fingers in the first set,
- the positioning fingers of the first set or long fingers comprise a shank having a first longitudinal axis and an end tip in an extension of the shank having a longitudinal axis which is offset in relation to the axis of the shank in a direction perpendicular to the axis of the shank,
- the long fingers of the fuel assembly holding tool are fixed to the supporting plate by mechanical fixing means through which the orientation of the finger about its longitudinal axis and thus the direction of the offset between the axis of the finger's shank and the end tip of the long finger can be adjusted,
- for loading fuel assemblies of square transverse cross-section in right prismatic locations of square cross-section within the core of a nuclear reactor the fuel assembly holding tool comprises a supporting plate having the shape of a square whose side is substantially equal to twice the size of the transverse cross-section of a location for a fuel assembly within the core of the nuclear reactor, four long fingers in the positions of the positioning holes for four adjacent fuel assemblies within the core of the nuclear reactor and four short fingers of shorter length than the long fingers in a direction perpendicular to the supporting plate in positions corresponding to the positions in transverse cross-section of four positioning holes for the four adjacent fuel assemblies located diagonally in each of the upper end members of the fuel assemblies in relation to the positioning holes in the positions of the long fingers, in the case of a nuclear reactor core comprising fuel assemblies of square transverse cross-section located within locations in the core of right prismatic shape having square transverse cross-sections arranged in a square grid arrangement, the fuel assembly holding tool comprises a supporting plate in the form of a square having dimensions corresponding to the dimensions of the transverse cross-sections of the three adjacent fuel assembly locations in the core, three long pins and three short pins designed to engage in positioning openings for the three adjacent fuel assemblies arranged in a square in the core of the nuclear reactor respectively, the long pins being inserted into first openings of each of the fuel assemblies and the three short pins respectively being inserted into three second positioning openings for the three fuel assemblies arranged in a square located diagonally with respect to the first openings receiving the long pins, the tool holding the fuel assemblies comprises a suspension and holding device similar to a suspension and holding device for an upper end member of a fuel assembly which is integral with the supporting plate on one surface of the supporting plate opposite a surface of the supporting plate on which the positioning pins are projectingly fixed.

In order to provide an understanding of the invention the method for loading a fuel assembly according to the invention and the devices used to effect that loading will now be described by way of example with reference to the appended figures.

FIGS. 3A and 4A are views of the end member in lateral elevation.

FIGS. 3B and 4B are views in cross-section along B-B in FIGS. 3A and 4A respectively.

Figure 1:
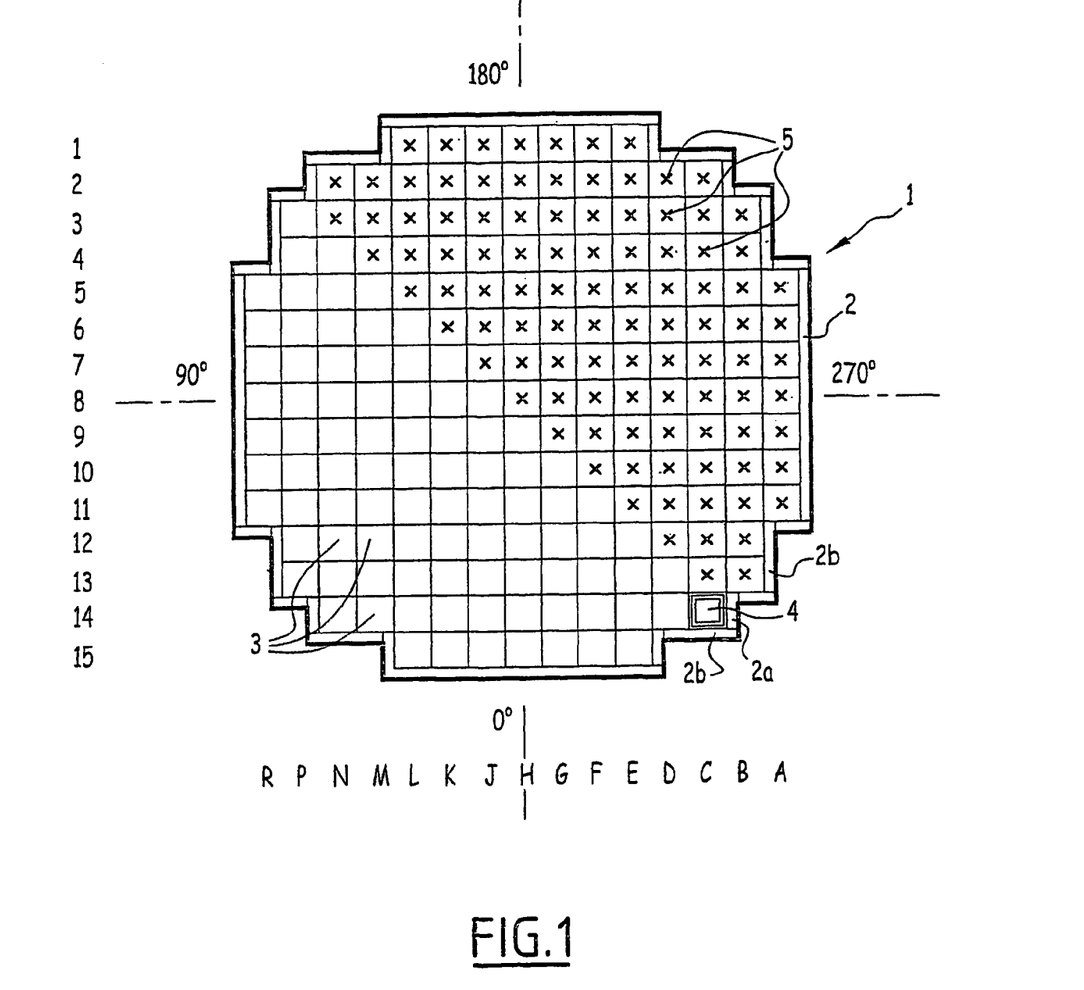
FIG. 1 is a diagrammatical view in cross-section along a horizontal plane of the core of a nuclear reactor showing the arrangement of right square shaped cross-sections of the locations for the fuel assemblies of the core.

FIG. 1 shows diagrammatically the transverse cross-section of the core 1 of a nuclear reactor which is bounded by a surrounding wall 2 comprising in particular vertical plates such that 2a and 2b have different widths and are assembled together to form a right angle following the peripheral contour of the core. Core 1 and surrounding wall 2 are arranged within the pressurised water nuclear reactor vessel in such a way that their lower parts rest on a supporting plate for the core secured within the reactor vessel.

The cross-sections of the locations 3 for the fuel assemblies of right prismatic shape of square cross-section are shown in FIG. 1. The square cross-sections of the locations 3 for fuel assemblies in core 1 form a square grid arrangement within boundary wall 2.

In FIG. 1 the core 1 of the nuclear reactor is shown while it is being loaded, the locations 3 for fuel assemblies into which an assembly has already been placed in the course of loading being identified by crosses.

Loading is carried out along successive diagonals of the square grid arrangement of core loading locations.

The orientations of the axial planes of symmetry of the core through the angles 0°, 90°, 180° and 270° clockwise are also shown in FIG. 1.

The positions of the locations 3 for fuel assemblies within the core are identified by indicating successive letters A, B, . . . , R for rows of locations parallel to the 0°-180° axial plane, and FIGS. 1, 2, . . . , 15 for rows parallel to the 90°-270° axial plane.

The loading of a fuel assembly into location C14, which is bounded by the enclosing wall on two sides and by an adjacent fuel assembly located in C13 on one side and having one side free not bounded by a fuel assembly or by the enclosing wall, will be described below, in particular with reference to FIGS. 1 and 12. It will be assumed that the fuel assembly located in C13 which was previously loaded into core 1 of the nuclear reactor has deformed through buckling so that part of the assembly and in particular an upper part of the assembly is displaced into the location C14 into which it is desired to load a fuel assembly. Because of the displacement of the fuel assembly positioned in C13 into location C14, the remaining cross-section of location C14 will not allow the fuel assembly which is intended to be loaded in it to pass and be inserted.

In a first stage the method according to the invention comprises inserting a dummy assembly 4 into location C14 to push the displaced part of the fuel assembly located in C13 back out of location C14.

Figure 2A:
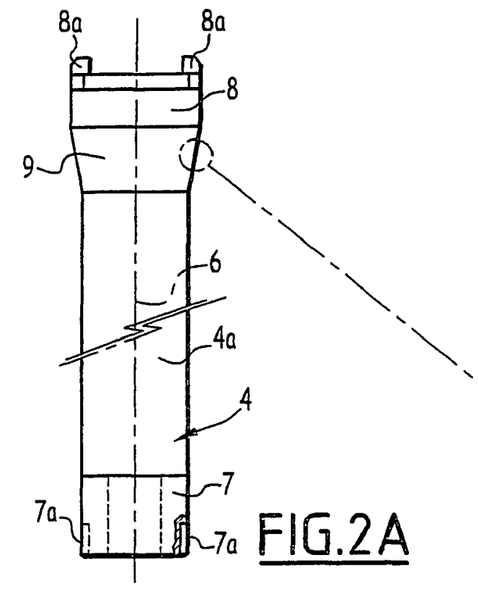
FIG. 2a is a view in lateral elevation of a dummy assembly for carrying out the method according to the invention, in a first embodiment thereof.

A dummy fuel assembly 4, which can reposition the upper part of fuel assembly 5 in C13 so as to free a passage for a replacement fuel assembly in the upper part of location 3 in C14 is illustrated in FIG. 2A.

The dummy assembly, which has the function of aligning the fuel assemblies adjacent to the loading location, will subsequently be referred to as the fuel assembly alignment tool (FAAT).

Dummy assembly or FAAT 4 has the general right prismatic shape of a location 3 for the positioning of a fuel assembly in the core. Central body 4a of FAAT 4 is a sheet metal envelope having flat lateral surfaces arranged in the manner of the faces of a right prism of square cross-section, that is to say a parallelepiped of square cross-section. Axis 6 of the right prismatic envelope which is connected at the bottom to a lower dummy end member 7 of square cross-section and openings 7a engaging two vertical positioning pins projecting from the upper surface of the core supporting plate in the loading location are also shown.

Central body 4a and lower end member 7 of the FAAT have a transverse cross-section whose side is slightly shorter than the side of the square cross-section of the lower end member or strut/grid of a fuel assembly 5 of the core which has standard dimensions.

FAAT 4 also has an upper end member 8 which is identical to the upper end member of a standard fuel assembly 5 in the core 1 of the nuclear reactor.

End member 8 has in particular gripping parts 8a through which the upper end member 8 can be gripped by the gripper of the nuclear reactor loading machine illustrated in FIG. 9, which will be described below.

Upper end member 8 of the FAAT is connected to central body 4a by an envelope 9 of pyramidal shape whose lateral surfaces are slightly inclined with respect to the axis 6 of the FAAT.

Figure 2B:
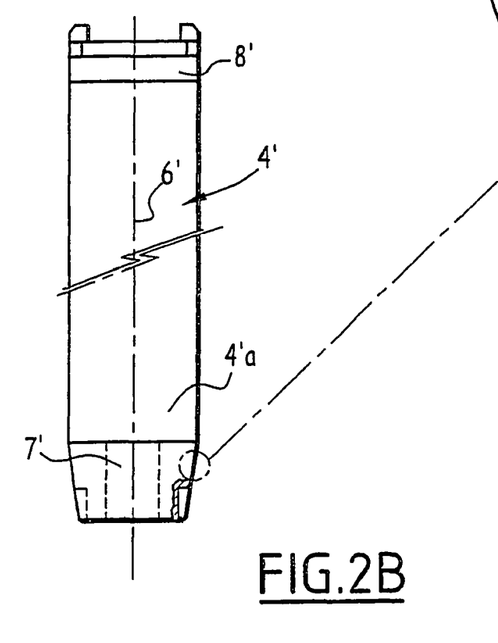
FIG. 2b is a view in lateral elevation of a dummy assembly for carrying out the method according to the invention, in a second embodiment thereof.
Figure 2C:
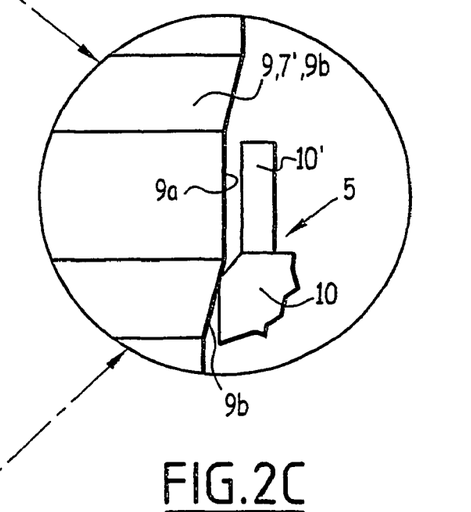
FIG. 2c is a magnified view of a detail of FIG. 2A or FIG. 2B.

As can be seen in FIG. 2C, the inclined surfaces of the connecting part 9 of the generally planar FAAT comprise successive parts 9a, which are substantially parallel to the axis 6 of the FAAT, and 9b, which are inclined with respect to the axis 6 through a small angle of the order of 0.5 to 6° and preferably from 1 to approximately 3.5°.

FAAT 4, which is used in a first stage of the process of reloading a fuel assembly, is picked up by the handling gripper of the nuclear reactor loading machine vertically above the reloading location, i.e. in the case in point vertically above location C14. The weight of the FAAT is not greater than the weight of a fuel assembly in which a moderating cluster is engaged. The FAAT supported from the gripper in a vertical position, i.e. with its axis 6 vertical, is lowered towards location C14 into which assembly 5 present in C13 is slightly displaced. The cross-section of lower end member 7 of FAAT 4, which is smaller than the maximum cross-section of a fuel assembly, i.e. the cross-section of a location 3, allows the lower part of FAAT 4 to be inserted readily. While the FAAT is being inserted into loading location 3 in position C14, the smooth lateral walls of lower end member 7 and then central body 4a can come into contact with the upper part of adjacent fuel assembly 5 in position 13 which has been displaced into location 3 in position C14. The fact that the FAAT has smooth lateral walls means that it can be inserted without any risk of becoming hooked onto adjacent assemblies and, in the case described, onto assembly 5 in position C13.

In the case where a fuel assembly is inserted in order to be loaded directly into a location between adjacent fuel assemblies, the end members and above all the grids of the fuel assembly projecting on the lateral sides of the fuel assembly are likely to become hooked onto components of adjacent fuel assemblies.

Once the FAAT has been inserted in location 3, the intermediate part 9 of the FAAT which has surfaces inclined with respect to axis 6 comes into contact with the upper part of fuel assembly 5 in position C13 which has become displaced into loading location 3.

FIG. 2C shows a portion of the lateral wall of intermediate part 9 of the FAAT in contact with the upper end member 10 of a fuel assembly 5 in position C13.

The inclination of the side wall of intermediate part 9 with respect to axis 6 of the FAAT along which movement in the vertical direction takes place is not constant, so that this inclined wall comes into contact with the edge of upper member 10 of fuel assembly 5 through its inclined parts 9b, and thus as it moves downwards brings about displacement of the upper end member 10 of adjacent assembly 5 in a direction away from the loading location, that is it brings about some realignment of the fuel assembly in relation to its theoretical longitudinal axis.

FIG. 2C shows part of the lateral edge of upper end member 10 of adjacent assembly 5 on which flat springs 10' are fixed along one side of end member 10.

The presence of sections 9a of the lateral surface of intermediate part 9 of the FAAT in the form of planar surfaces substantially parallel to axis 6 of the FAAT between two successive inclined parts 9b prevents springs 10' from coming into contact with the inclined wall of intermediate part 9 while it is being moved downwards. In the event of contact with springs 10', the side wall of intermediate part 9 of the FAAT would risk deformation and damage to springs 10' while the latter is moving downwards. The presence of inclined parts and parts parallel to the axis of movement of the FAAT on the lateral surface of intermediate part 9 makes it possible to realign adjacent fuel assembly 5 to move it away from loading location 3 in successive stages, springs 10' of the upper end member of adjacent assembly 5 being always at a distance from the lateral surface of intermediate part 9 of the FAAT.

When the FAAT has been fully inserted into loading location 3 for the fuel assembly in position C14, over substantially the full height of the location, openings 7a in lower end member 7 have engaged the positioning pins in the fuel assembly location and the adjacent assembly in position C13 is wholly replaced so as to completely free the upper part of the loading location.

FIG. 2B illustrates a different embodiment of the dummy assembly or FAAT 4', this embodiment of the FAAT making it possible to restraighten and realign the fuel assembly or assemblies adjacent to the loading location over their entire height.

According to the variant embodiment, FAAT 4' comprises a dummy assembly having smooth lateral walls and its transverse cross-section has the maximum dimension of the transverse cross-section of a fuel assembly, i.e. the dimension of upper end member 8' and the struts/grids of the fuel assembly.

Lower end member 7' of the FAAT has a lateral surface of pyramidal shape, the lateral sides of end member 7' being inclined with respect to axis 6' of the FAAT in such a way that the cross-section of the end member increases from a section of dimensions smaller than the maximum cross-section of the fuel assembly and loading location 3 up to a cross-section which is equal to the maximum cross-section of the fuel assembly also corresponding to the cross-section of upper end member 8'.

Furthermore, the lateral surfaces of lower end member 7' of the FAAT have a shape such as shown in FIG. 4 and described above in relation to the lateral walls of intermediate part 9. The lateral walls of end member 7', which are generally inclined in relation to the axis 6' of the FAAT, have inclined parts similar to parts 9b of the lateral surfaces of intermediate part 9 and parts substantially parallel to axis 6' similar to portions 9a of the inclined surfaces of intermediate part 9. Thus contact between the lateral surfaces of end member 7' and springs 10' of the upper end member of adjacent assembly 5 in position C13 is avoided when the FAAT engages within loading location 3 in position C14.

End member 7' is easily inserted into the upper part of location 3 in position C13 because of its smaller cross-section, and downwards movement of the FAAT in the direction of its axis 6' brings about progressive realignment of assembly 5 in position C13. As previously the smooth walls of the FAAT allow the FAAT to be inserted without any risk of becoming hooked onto the assembly or assemblies adjacent to loading location 3 in position C14.

FIGS. 3A and 3B and 4A and 4B show two variant embodiments of a lower end member 7 (or 7') of a FAAT which enable FAAT 4 to rest and remain on the supporting plate for the core of the nuclear reactor in a perfectly stable manner.

In each of the locations 3 for a fuel assembly, as indicated above the supporting plate for the core comprises two upwardly projecting positioning pins along a first diagonal of the location and large diameter through openings for the passage of water, or water holes, arranged in particular along a second diagonal of location 3 perpendicular to the first diagonal.

Figure 3A:
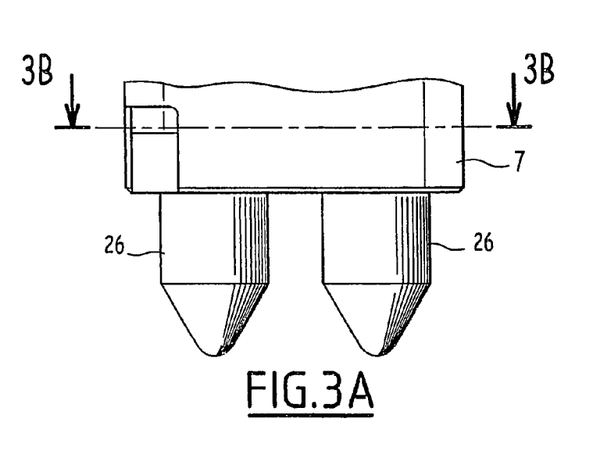
FIGS. 3A and 3B relate to a first variant embodiment of the lower end member of a dummy assembly.
Figure 3B:
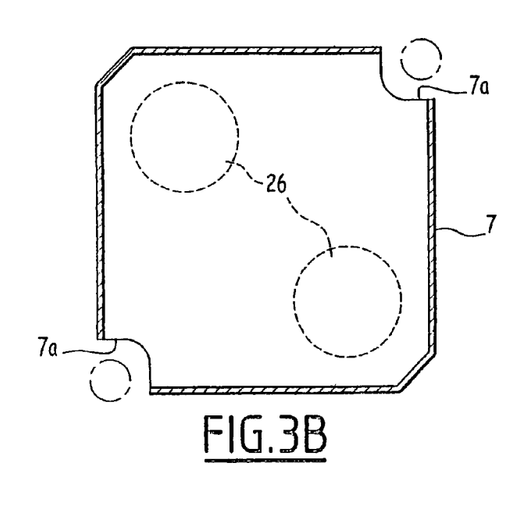

In accordance with a first embodiment of the FAAT illustrated in FIGS. 3A and 3B, lower end member 7 (or 7') incorporating the engaging openings 7a for the positioning pins at two corners also has two studs 26 located on a second diagonal of the end member projecting in the axial direction above the lower surface of the end member, the diameter of which is substantially equal to or slightly less than the diameter of the water hole in the plate supporting the core.

Figure 4A:
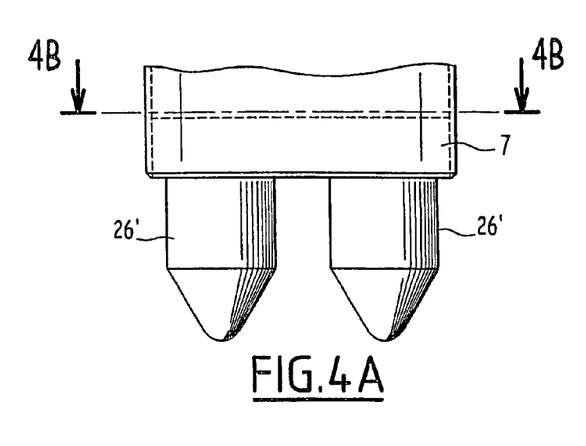
FIGS. 4A and 4B relate to a second variant embodiment of the lower end member of a fuel assembly.
Figure 4B:
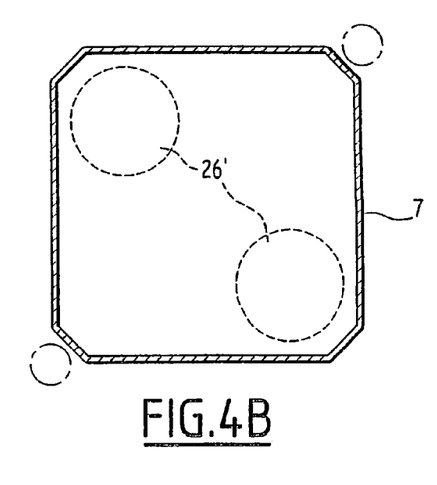

According to a second variant embodiment illustrated in FIGS. 4A and 4B, the lower end member of the FAAT of square cross-section has smaller dimensions in comparison with the end member illustrated in FIGS. 3A and 3B in such a way that it can rest on the supporting plate for the core between the positioning pins of a location 3 for a fuel assembly without interfering with the positioning pins; in this case the lower end member 7 of the FAAT only has large diameter studs 26' projecting beneath its lower surface to engage in the water holes and has no openings such as 7a for passage of the positioning pins.

In all situations, studs 26 or 26' which are engaged in the water holes of the plate supporting the core can be used to achieve very stable positioning of the FAAT in the core of the nuclear reactor.

When the FAAT is in position, the assembly or assemblies adjacent to the loading location will be realigned into positions which provide full access to the loading location. However the assembly or assemblies adjacent to the loading location must be held in their realigned position, at least at the top, independently of the FAAT, so that a further fuel assembly can be loaded into the loading location.

One or more tools such as illustrated in FIGS. 5, 6A, 6B and 7 may be used in order to hold the fuel assemblies adjacent to the loading location in place. The fuel assembly holding tool (FAHT), indicated in general by reference 11, comprises a supporting plate 12 of square shape whose cross-section corresponds to the cross-section of four locations fitted with fuel assemblies 5, a suspension and holding device 13 integral with an upper surface of plate 12 and positioning and holding pins 14 attached to and projecting beneath plate 12 opposite suspension and holding device 13.

Figure 9:
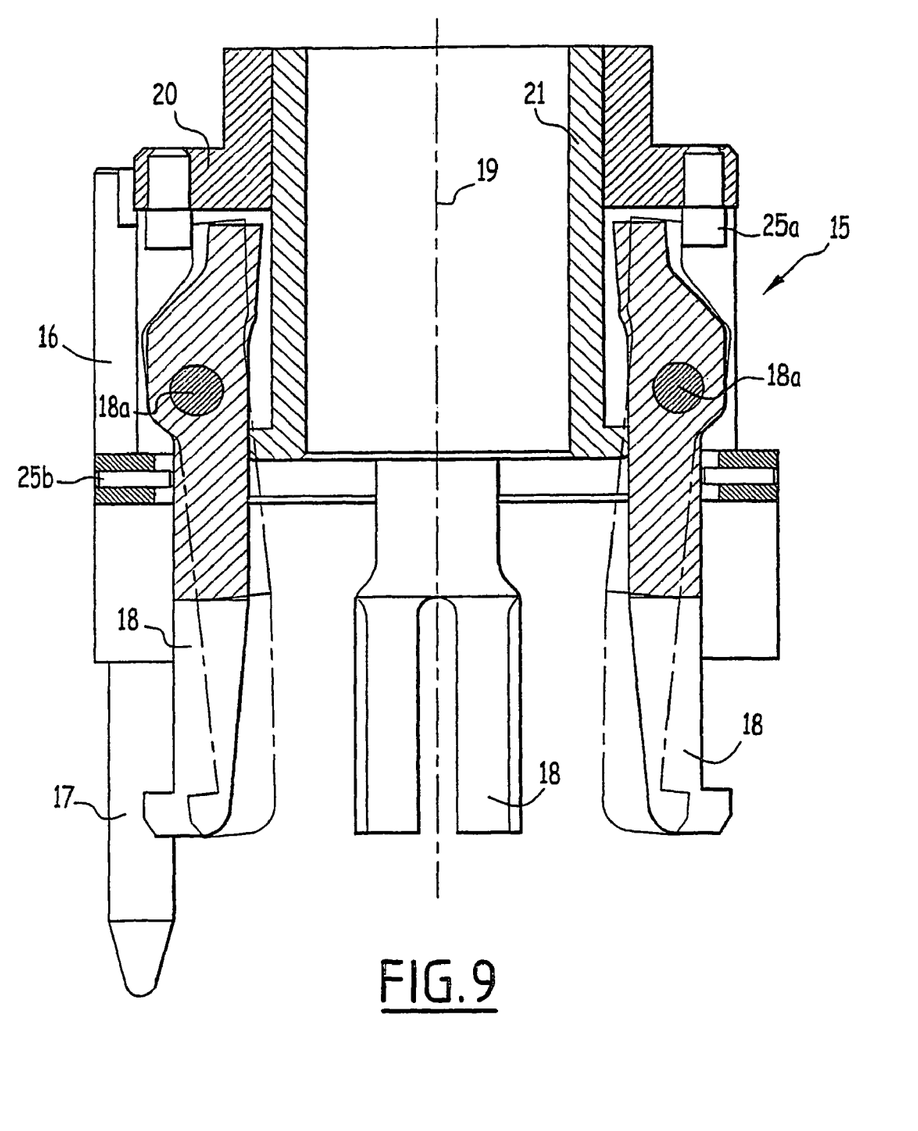
FIG. 9 is a view of a handling gripper of the holding tool illustrated in FIG. 5, in elevation and vertical cross-section.

Suspension and holding device 13 is similar to an upper end member of a fuel assembly which can be picked up by the gripper of the fuel loading machine illustrated in FIG. 9.

Figure 5:
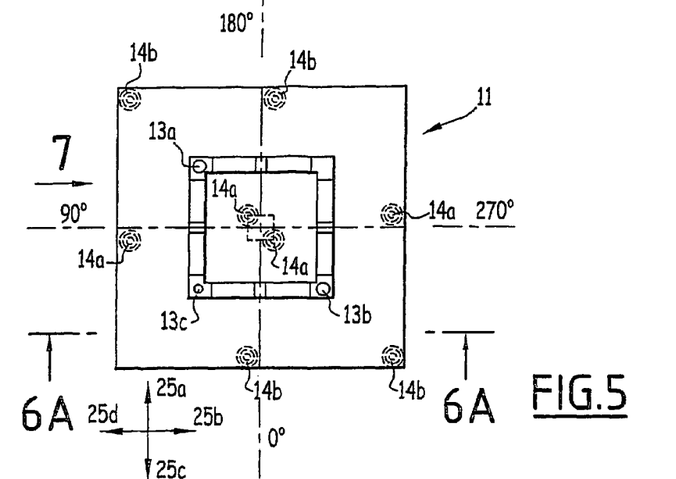
FIG. 5 is a view from above of a holding tool for the fuel assemblies adjacent to a loading location.

Suspension and holding device 13 comprises a square frame similar to the upper extremity of a fuel assembly end member comprising positioning holes 13a, 13b in two diagonal corners and a hole 13c for engaging a finger of the gripper of the loading machine, comprising an element ensuring proper positioning, in a third corner on a second diagonal. In fact the gripper of the loading machine must always be placed in the same orientation in relation to the FAHT, which must itself be placed in a fixed orientation above the four adjacent fuel assemblies inserted into the core of the nuclear reactor.

As may be seen in FIG. 9, the fuel assembly handling gripper used for handling FAHT 11 and in general indicated by reference 15 comprises a support 16 on which finger 17 ensuring correct orientation and four gripping fingers 18 pivotally mounted about an axis 18a at right angles to axis 19 of the handling device are mounted on support 16 which is integral with a mast 20 of the loading machine.

An operating tube 21 slidably mounted within mast 20 of the loading machine is used to move fingers 18 between a projecting position illustrated by solid lines in FIG. 9 and a retracted position shown by dotted and dashed lines for one of fingers 18.

Gripper 15 with fingers 18 in the retracted position is inserted into the inner space of the square frame of suspension device 13 of FAHT 11 and then the fingers are manoeuvred into the projecting position by operating tube 21.

It should be noted that in their retracted and operating positions fingers 18 bear against corresponding stops 25a and 25b.

Fingers 18 of the gripper bear against the frame of suspension device 13 of the FAHT in the median zones of the four sides of the frame of suspension device 13. In orientation the position of the FAHT beneath the gripper is determined by orientating finger 17 which is inserted into orientating hole 13c of suspension device 13.

Figure 6A:
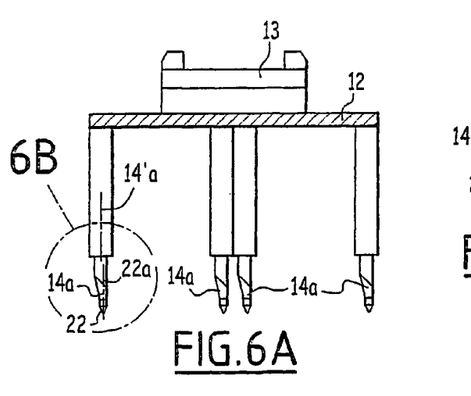
FIG. 6A is a view of the holding tool according to 6A in FIG. 5 in elevation and partial vertical cross-section.
Figure 7:
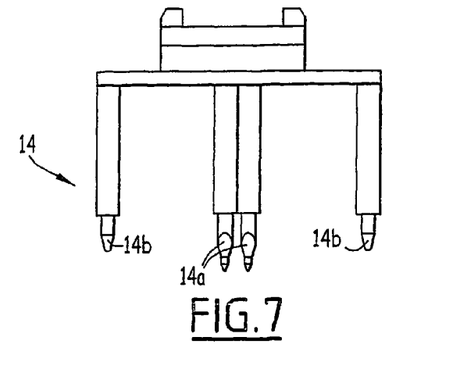
FIG. 7 is a view of the holding tool according to 7 in FIG. 5 in elevation.

As may be seen in FIGS. 5, 6A and 7, the pins engaging and holding the FAHT comprise four long pins 14a which may be seen in particular in FIG. 6A and four short pins 14b, two of which are visible in FIG. 7.

Figure 12:
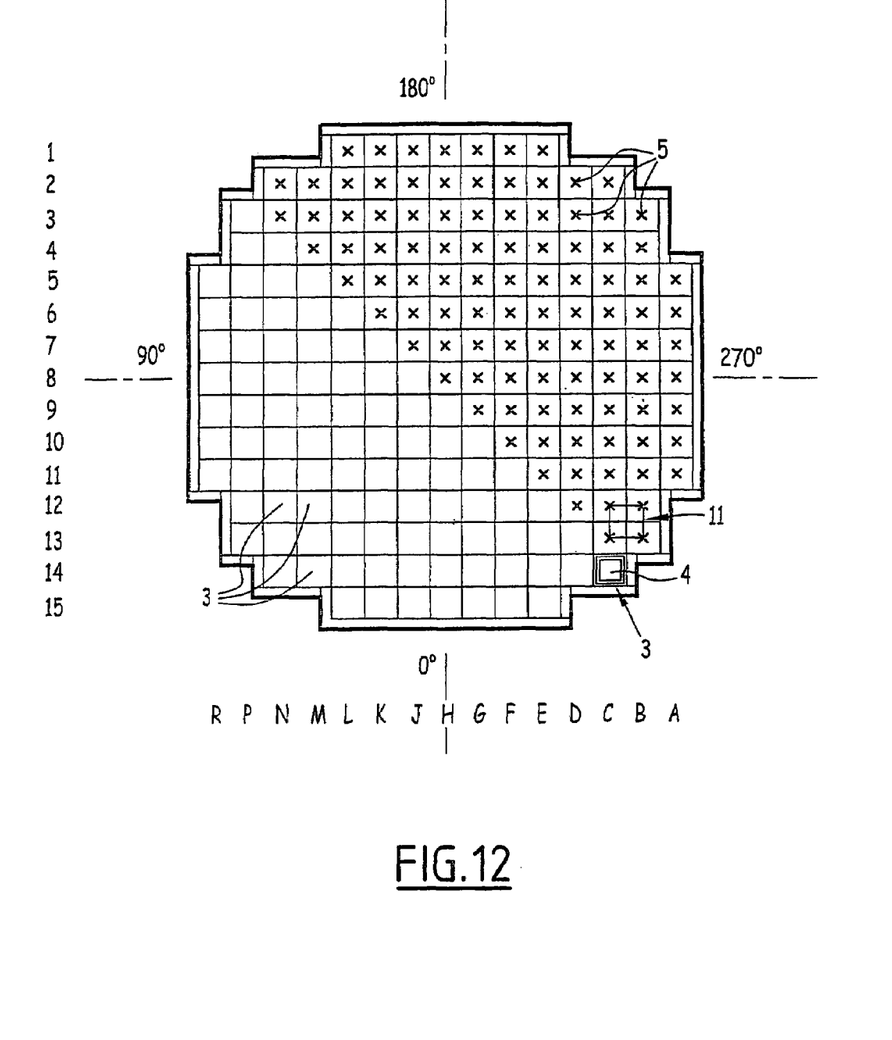
FIG. 12 is a diagrammatical view of a transverse cross-section of the core of a nuclear reactor similar to the view in FIG. 1 showing the method of loading according to the invention being carried out.

FIG. 5 shows the directions of the axial planes of the reactor vessel at 90°-270° and 0°-180° in the plane of plate 12, as illustrated in FIG. 1 and FIG. 12, when the FAHT is in the operating position above assemblies in the core of the nuclear reactor.

Long pins 14a of the FAHT are located at the corners of fuel assembly cross-sections and adjacent and on either side of the 90°-270° axial plane of the reactor vessel and the reactor core.

The short pins are placed diagonally opposite the long pins in each of the fuel assembly cross-sections on which the FAHT is positioned.

When the FAHT is positioned above four fuel assemblies, for example above the fuel assemblies in locations C12, C13, B12 and B13 illustrated in FIG. 12, the FAHT has a long pin and a short pin in diagonal positions for each of the fuel assemblies.

Figures 6B, 8:
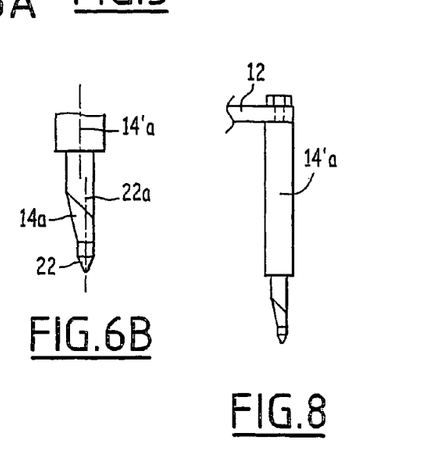
FIG. 6B is a magnified view of detail B in FIG. 6A.
FIG. 8 is a detailed view of a pin of the holding tool constructed in accordance with a variant which permits the orientation of the pin to be adjusted.

As may be seen in particular in FIG. 6B, long pins 14a have a shank and lower extremity portion of smaller diameter produced by a positioning tip 22 whose axis 22a is offset in an axial direction of the core in relation to the axis 14'a of the shank of the long pin.

The offset between axis 22a of positioning tip 22 and the axis 14'a of the shank of a long finger 14a may for example be 5 mm in a direction which may be the horizontal direction of the FAHT which is intended to be positioned along the 90°-270° axial direction of the core of the nuclear reactor on which loading is being carried out.

The offset between the axis of positioning tip 22 and the axis of the shank of the long pin may also be provided in the 0°-180° direction of the core and reactor vessel of the nuclear reactor, in either direction.

The orientation of the offset of the axis of the positioning tips of the long fingers of the FAHT is selected on the basis of the observed offset in the position of the assembly or assemblies adjacent to the loading location, so as to ensure that the long fingers of the FAHT are centred and easily positioned when it is positioned above the four fuel assemblies in positions as shown in B12, B13, C12 and C13 in FIG. 12.

Figure 10A:
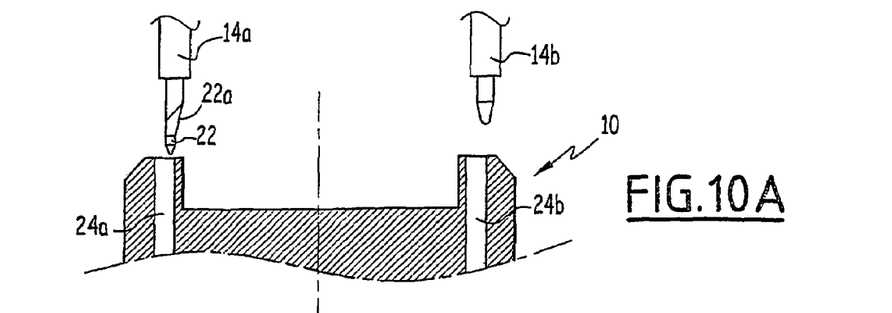
FIGS. 10A, 10B and 10C show positioning of the holding tool on a fuel assembly in the course of three successive stages.
Figure 10B:
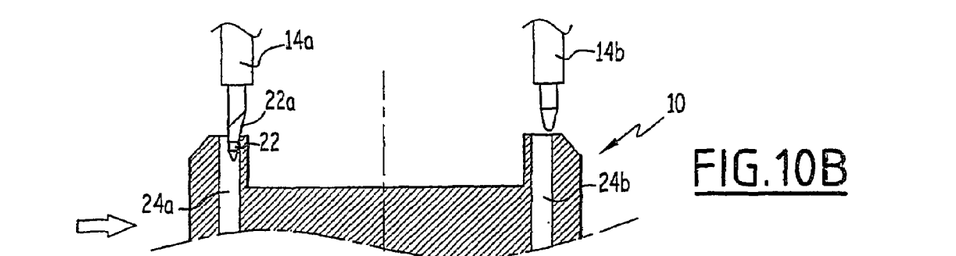

The FAHT picked up by the handling gripper of the loading machine is placed above the assemblies in positions B12, B13, C12, C13 and lowered, as shown in FIG. 10A, in such a way that for each of fuel assemblies 5 in positions B12, B13, C12, C13 the positioning tip 22 of a corresponding long finger 14a is positioned above a positioning hole 24a of the upper end member 10 of fuel assembly 5.

By lowering the FAHT in the vertical direction, the tips 22 of long fingers 14a of the FAHT ensure that the end members of the fuel assemblies are put back into position by acting together with holes 24a, 24b of the end members of the fuel assemblies through an inclined ramp 22a on tip 22, in a direction ensuring centering with respect to the axis of positioning fingers 14a and 14b of holes 24a and 24b in which these positioning fingers are engaged.

Figure 10C:
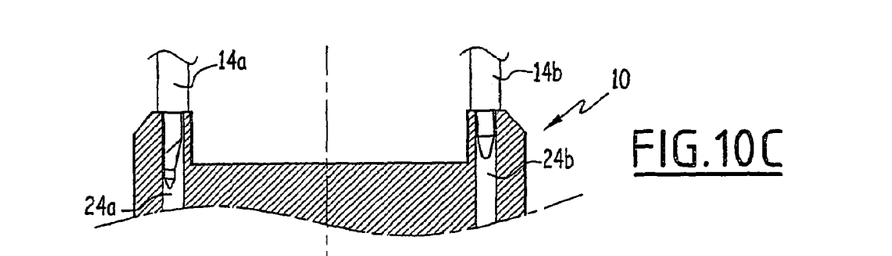

As may be seen in FIG. 10C, fingers 14a and 14b in a centred position are then engaged in corresponding positioning holes 24a and 24b of upper end member 10 of the fuel assembly shown. Positioning fingers 14a and 14b of the three other fuel assemblies are simultaneously engaged in the positioning holes of the upper end members of these fuel assemblies.

The engagement of fingers 14a and 14b in positioning holes 24a and 24b of the fuel assembly upper end members with virtually no play ensures that the four upper end members of the fuel assemblies in positions B12, B13, C12, C13 are kept in relative position and in particular that the end member and the upper part of the fuel assembly in position C13 adjacent to loading position C14 are held in position. The FAAT can then be removed from loading location 3 in position C14 without the end member and the upper part of fuel assembly 5 in position C13 again becoming displaced in the direction of the loading location.

The fuel assembly can then be loaded into loading location C14, as the upper part of the adjacent fuel assembly in position C13 is no longer out of position within location C14.

In the situation where an assembly is loaded into location C14 as illustrated in FIG. 12, a single FAHT device 11 placed on four fuel assemblies can realign the adjacent fuel assembly in position C13, the other sides of the fuel assembly being loaded coming into contact with the surrounding wall or facing an empty fuel assembly location.

In other cases, the loading location will be surrounded by at least two adjacent fuel assemblies which may be displaced towards the interior of the loading location. In this case two or more FAHT may be used in such a way as to ensure that the adjacent fuel assemblies surrounding the loading location are held in position once they have been realigned by fitting the FAHT.

Up to four FAHT devices 11 may be used for example, as illustrated in FIGS. 5 to 7, to ensure that four fuel assemblies surrounding a loading location are held in position in the situation where a fuel assembly is inserted into the core, for example on completing loading or after loading.

Figure 11:
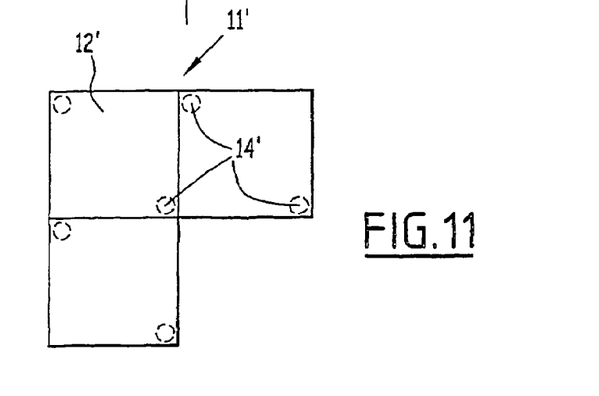
FIG. 11 is a view from above of a holding tool according to a variant embodiment similar to the view in FIG. 5.

As may be seen in FIG. 11, a FAHT device 11' constructed in accordance with a variant and designed to ensure that three fuel assemblies surrounding a loading location are held in position may be used. In this case it may be possible to use only two FAHT devices 11' positioned on two out of three fuel assemblies surrounding a loading location within the core.

A FAHT device as illustrated in FIG. 11 comprises six centering pins 14', three of which are long pins and three are short pins.

As explained above, the FAHT device must be attached to the loading machine in such a way that its two horizontal axes are located in the axial planes of the core and reactor vessel respectively, at 0-180° and 90°-270°.

Depending upon the direction of the offset of the positioning holes in the upper end members of the fuel assemblies on which the FAHT is placed, it will then be necessary to select one of the four FAHT tools having long fingers whose positioning tips are offset in one of directions 25a, 25b, 25c and 25d illustrated in FIG. 5. Appropriate FAHT tools must therefore be available for each of the directions in which the fuel assemblies are realigned at the time when the FAAT is fitted.

As may be seen from FIG. 8, the construction of a FAHT tool comprising long fingers 14a attached to plate 12 of the FAHT in such a way that they can be orientated about their axes 14'a and fixed in any desired orientation depending upon the direction in which the fuel assemblies have to be realigned may be envisaged. It is possible for example to construct the upper part of the lining of the long finger in the form of a threaded rod which engages an opening in plate 12 and is immobilised by a fixing nut.

After the fuel assembly has been loaded the FAHT or FAHTs are withdrawn and removed from the pool.

The method and device according to the invention may be adapted to the situation of loading fuel assemblies of right prismatic shape having a transverse cross-section which is not square and placed in locations of corresponding shape in a grid arrangement of any type.

The invention claimed is:

1. A device for loading a fuel assembly (5) into a loading location (3) in a core (1) of a nuclear reactor comprising fuel assemblies (5) of general right prismatic shape located within an enclosing wall (2) in adjacent prismatic locations (3) having vertical axes whose transverse cross-sections in a horizontal plane constitute a regular arrangement, a loading location (3) for the fuel assembly comprising at least one vertical lateral surface according to which a lateral surface of a fuel assembly (5) adjacent to the fuel assembly being loaded is positioned, characterized in that it comprises a fuel assembly realignment tool (4) in a form of a dummy assembly having a generally right prismatic shape of a location (3) for a fuel assembly (5) in the core and laterally bounded by smooth walls, and at least one tool for holding fuel assemblies (11) comprising a supporting plate (12) and positioning pins (14) designed to engage simultaneously the positioning openings of upper end members (10) of at least two different fuel assemblies in the core, and to keep said at least two fuel assemblies in relative positions, as well as at least one handling means (15) for gripping and handling the realignment tool for the fuel assemblies (4) and the at least one tool for holding the fuel assemblies (11) through suspension and holding means (8, 13).

2. A device according to claim 1, characterized in that the suspension and holding means (8, 13) of the tool for realigning fuel assemblies (4) and the tool for holding fuel assemblies (11) is similar to a suspension and holding part of an upper end member (10) of a fuel assembly (5) for the core and that the handling device of the tool for realigning fuel assemblies (4) and the tool holding fuel assemblies (11) is a gripper (15) of a nuclear reactor loading machine.

3. A device according to claim 1, characterized in that the tool for realigning fuel assemblies (4) comprises a central body (4a, 4'a), an upper end member (8, 8') and a lower end member (7, 7') having a common longitudinal axis (6, 6') and a transverse cross-section in a plane perpendicular to the axis (6, 6') having the shape of a transverse cross-section of a location (3) for a fuel assembly in the core of the nuclear reactor.

4. A device according to claim 3, characterized in that the central body (4a) and the lower end member (7) of the tool for the realignment of fuel assemblies (4) of right prismatic shape has a transverse cross-section having dimensions which are smaller than the dimensions of the transverse cross-section of a location for fuel assemblies in the core, an upper end member (8) whose transverse cross-section has the dimensions of the transverse cross-section of a location for a fuel assembly (5) in the core (1) of the reactor and an intermediate part (9) between the central body and the upper end member (8) bounded by lateral walls which are inclined in relation to the axis (6) of the tool for the realignment of fuel assemblies which has a transverse cross-section of generally increasing dimensions between the central body (4a) and the upper end member (8).

5. A device according to claim 3, characterized in that the tool for the realignment of fuel assemblies (4') comprises a central body (4'a) of right prismatic shape whose transverse cross-section has the dimensions of the transverse cross-section of a location (3) for a fuel assembly (5) in the core (1) of the reactor and a lower end member (7) having lateral walls inclined in relation to the axis (6') of the tool for the realignment of fuel assemblies in such a way that the transverse cross-section of the lower end member (7') has decreasing dimensions between the central body (4'a) and its lower engaging extremity in a location (3) in the core (1) of the nuclear reactor.

6. A device according to claim 3, characterized in that the lower end member (7, 7') of the realignment tool (4) comprises lateral openings (7a) for a passage of positioning pins for a location (3) in the core (1) of the reactor and two posts (26) engaging in the water holes of the location (3) when the realignment tool (4) is positioned on supporting plate for the core (1) of the reactor.

7. A device according to claim 3, characterized in that the lower end member (7) of the realignment tool (4) has a cross-section such that it can be engaged between the positioning pins of a location for a fuel assembly in the core (1) of the reactor and two posts (26') engaging in the water holes of location (3) when the realignment tool (4) is positioned on the supporting plate for the core (1) of the reactor.

8. A device according to claim 4, characterized in that the walls inclined with respect to the axis (6, 6') of the intermediate part (9) or the lower end member (7') of the tool for the realignment of fuel assemblies (4, 4') have successive portions (9a, 9b) in the direction of the axis (6, 6') which are inclined with respect to the axis (6, 6') and substantially parallel to the axis (6, 6').

9. A device according to claim 2, characterized in that the tool holding the fuel assemblies (11) comprises a supporting plate (12), a first set of positioning fingers (14a) and a second set of positioning fingers (14b) which are parallel to each other and are fixed in arrangements perpendicular to the supporting plate (12), the positioning fingers (14b) of the second set having a length in the direction perpendicular to the supporting plate (12) which is shorter than the length of the fingers (14a) of the first set.

10. A device according to claim 9, characterized in that the positioning fingers (14a) of the first set or long fingers comprise a shank having a first longitudinal axis (14'a) and an extremity tip (22) in a prolongation of the shank having a longitudinal axis (22a) which is offset with respect to the axis (14'a) of the shank in a direction perpendicular to the axis of the shank (14'a).

11. A device according to claim 10, characterized in that the long fingers (14a) of the tool holding fuel assemblies (11) are attached to the supporting plate (12) by mechanical fixing means through which the orientation of a finger (14a) about its longitudinal axis (14'a) and thus the direction of offset between the axis (14'a) of the shank of the finger and (22a) of the extremity tip of the long finger (14a) can be adjusted.

12. A device according to claim 9 for loading fuel assemblies of square transverse cross-section in right prismatic locations of square cross-section in the core (1) of a nuclear reactor, characterized in that the fuel assembly holding tool (11) comprises a supporting plate (12) in the shape of a square whose side is substantially equal to twice the side of the transverse cross-section of one location (3) for a fuel assembly (5) in the core (1) of the nuclear reactor, four long fingers (14a) in the positions of positioning holes for the four adjacent fuel assemblies (5) in the core (1) of the nuclear reactor and four short fingers (14b) of a length shorter than the length of the long fingers in a direction perpendicular to the supporting plate (12) in positions corresponding to the positions in transverse cross-section of four positioning holes for the four adjacent fuel assemblies located on a diagonal on each of the upper end members of the fuel assemblies (5) in relation to the positioning holes in the positions of the long fingers (14a).

13. A device according to claim 9, in the case of a core (1) of a nuclear reactor comprising fuel assemblies (5) having a square transverse cross-section positioned in locations (3) of the core of right prismatic shape having square transverse cross-sections arranged in a square grid arrangement, characterized in that the tool holding fuel assemblies (11') comprises a supporting plate (12') in the shape of a square having dimensions corresponding to the dimensions of the transverse cross-sections of the three locations for adjacent fuel assemblies (5) in the core (1), three long pins and three short pins designed to engage respectively the positioning openings of three adjacent fuel assemblies arranged in a square in the core (1) of the nuclear reactor, the long pins being inserted in to the first openings of each of the fuel assemblies and the three short pins being inserted respectively in three second positioning openings for the three fuel assemblies arranged in a square located diagonally with respect to the first openings receiving the long pins.

14. A device according to claim 9, characterized in that the fuel assembly holding tool (11, 11') comprises a suspension and holding device (13) similar to a suspension and holding device of an upper end member (10) of a fuel assembly (5) integral with the supporting plate (12) on one side of the supporting plate (12) opposite a side of the supporting plate (12) on which the positioning pins (14a, 14b) are fixed projectingly.

* * * * *